A. G. KOECHLIN.
SPOOL CHANGING APPARATUS FOR LOOMS.
APPLICATION FILED JAN. 14, 1913.

1,088,824.

Patented Mar. 3, 1914.
2 SHEETS—SHEET 1.

WITNESSES

INVENTOR
Albert Georg Koechlin
By H. B. Willson & Co
ATTORNEYS

A. G. KOECHLIN.
SPOOL CHANGING APPARATUS FOR LOOMS.
APPLICATION FILED JAN. 14, 1913.

1,088,824.

Patented Mar. 3, 1914.
2 SHEETS—SHEET 2.

WITNESSES
A. Van Loock

INVENTOR
Albert Georg Koechlin
By H. B. Wilson & Co.
ATTORNEYS

UNITED STATES PATENT OFFICE.

ALBERT GEORG KOECHLIN, OF BASEL, SWITZERLAND, ASSIGNOR, BY MESNE ASSIGNMENTS, TO DRAPER COMPANY, OF HOPEDALE, MASSACHUSETTS, A CORPORATION OF MAINE.

SPOOL-CHANGING APPARATUS FOR LOOMS.

1,088,824.

Specification of Letters Patent.

Patented Mar. 3, 1914.

Original application filed August 1, 1911, Serial No. 641,836. Divided and this application filed January 14, 1913. Serial No. 742,018.

*To all whom it may concern:*

Be it known that I, ALBERT GEORG KOECHLIN, a citizen of the Swiss Republic, manager of the Spinnerei & Weberei Steinen, A.-G., of Steinen, in the Grand Duchy of Baden, Germany, and residing at Basel, Switzerland, have invented certain new and useful Improvements in and Relating to Spool-Changing Apparatus for Looms, of which the following is a specification, and which is a division of application Serial No. 641,836, filed August 1, 1911.

This invention relates to spool changing apparatus for looms, in combination with which tubular spools having the loose end of the winding inserted into the interior of the spool tube, are employed, and has for its object the removal of the said loose end so as to free it when the spool is about to be placed in the shuttle.

In United States Letters Patent No. 971,541 dated 4th October 1910, the pointed ends of the bobbins or spools are provided with a cap around which is coiled the loose end of the weft thread, this cap being removed by a blast of compressed air previously to the spool passing into the shuttle, so as to free the end of the thread, this operation taking place when each spool in turn assumes the position of lowest but one in the discharge channels of the spool magazine.

According to the present invention, the spool with the loose end of the thread arranged within the bore thereof, which may be enlarged for the purpose, is subjected to the action of a jet of compressed air when it assumes the lowest position, in the discharging guideways of the spool magazine, for the purpose of expelling the loose thread end.

Reference will now be made to the accompanying drawings which illustrate the invention as applied by way of example to a machine of the kind shown in the patent above mentioned.

Figure 1:
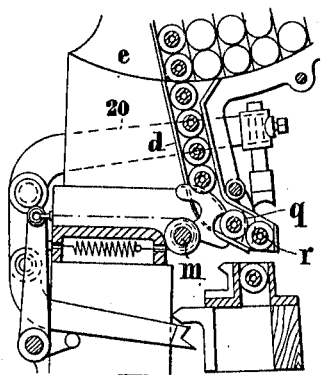
Figure 2:
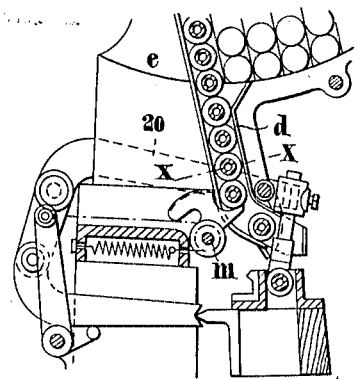
Figure 3:
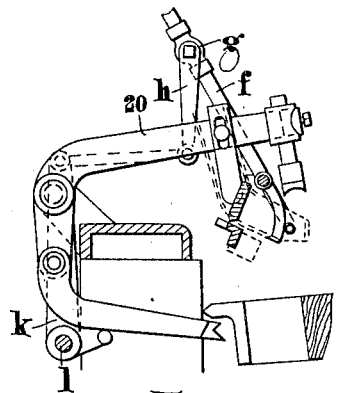
Figure 4:
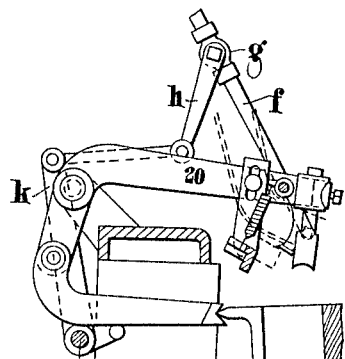
Figure 5:
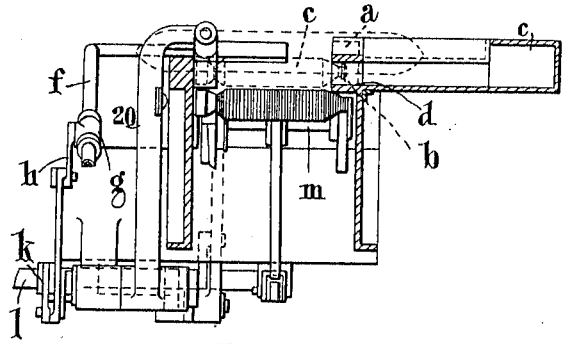
Figure 6:
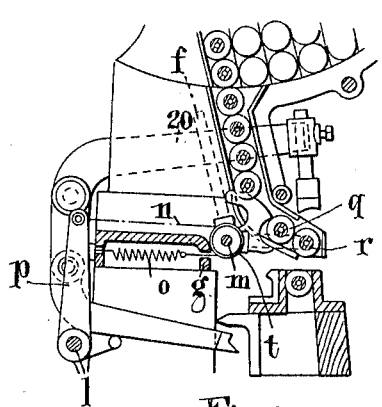

Figure 1 is a vertical section of improved apparatus in which the situation of the spools and the positions of the operative parts are shown in a state of rest. Fig. 2 is a similar view showing the positions of the parts immediately after a spool has been changed. Fig. 3 is a side elevation of the spool ejecting mechanism in a state of rest. Fig. 4 is a similar view of the spool ejecting mechanism immediately after a spool has been changed. Fig. 5 is a horizontal section on the line X—X Fig. 2. Fig. 6 is a modification, and Fig. 7 and 8 are sectional views of the upper ends of two forms of bobbin used in connection with the present invention.

Figure 7:
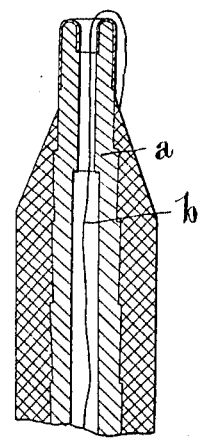
Figure 8:
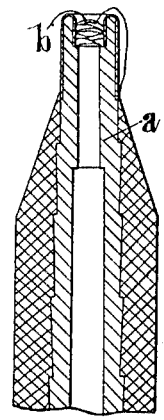

Referring to Figs. 1 to 8, the spool tubes or bobbins $a$, with the end of the weft thread $b$ arranged loosely therein as in Fig. 7 or formed as a bundle or ball placed in a recess at one end as in Fig. 8, moves successively down the fixed discharging guideways $d$ of the magazine $e$. At a suitable point in its travel, the end of each bobbin comes into register with the end of a compressed air pipe to blow out the end of the weft thread. This operation may be effected when the spool reaches the lowest position $r$, the next lowest position $q$ or any other suitable position. The compressed air pipe $f$ has a plug cock or cut off valve $g$ operated by means of a lever $h$ linked to a lever $k$. The latter lever is mounted on the usual weft-detector controlled shaft $l$ which is under the influence of the weft fork or weft feeler and is rotated through a small angle when the fork is brought into operation by a breakage of the weft or when the feeler mechanism is brought into operation in the usual manner when the weft has been used up. When the shaft $l$ is thus operated, the parts assume the positions shown in Figs. 2, 4 and 5 the valve $g$ being opened somewhat in advance, and independently of the stroke of the ejector or hammer 20 by means of which the lowest spool is transferred to the shuttle.

The extent of movement of the lever $h$ which determines the amount of the opening of the valve $g$ may be regulated by allowing it to have some amount of play. The levers $h$ and $k$ need not be in rigid connection with the valve, and if desired the lever $h$ may have a heel or hook at its end arranged to open the valve to any desired extent. Instead of operating the valve in this manner it may be done by means in operative connection with the shaft $m$, from which the feeding of the spools is effected. Referring to Fig. 6 a lever $p$ is mounted on the shaft $l$, and the end of the lever is connected by means of a flexible band or strap $n$ with a spring $o$. The valve $g$ is arranged on the same axis as the shaft $m$ and is operated from the lever by a wheel or pulley $t$ on the valve, the pulley being actuated by the band $n$ passing around it. The valve is in communication with the bobbin in the lowest position. The strap or band may obviously be replaced by any other elastic connecting means, and the length of the strap or band determines the amount of opening of the valve.

When the end of the weft thread is blown out in the manner above described, it is unnecessary to hold the spool in position by means of the gripper described in the patent above mentioned, since the flaps at the lower ends of the discharging guideways $d$ will be sufficient for the purpose.

It is further to be understood that the invention may be carried into effect in numerous ways and may also be realized by the use of the mechanism described in the specification hereinbefore mentioned.

Having now described my invention what I desire to secure by Letters Patent is:—

1. The combination with a loom of a spool magazine containing a number of spools each having a loose thread end arranged in its internal space, discharging guideways on the magazine to receive the spools, a shuttle in the loom adjacent to the end of the guideways, means for subjecting the interior space of the lowest spool in the guideways to the action of a jet of compressed air to remove the thread end from the interior of the spool, and means for subsequently inserting the spool into the shuttle.

2. The combination with a loom of a spool magazine containing a number of spools each having a loose thread end arranged in its internal space, discharging guideways on the magazine to receive the spools, a shuttle in the loom adjacent to the guideways, means for subjecting the interior space of the lowest spool in the guideways to the action of a jet of compressed air to remove the thread end from the interior of the spool, and independent means for subsequently inserting the spool into the shuttle.

3. The combination with a loom of a spool magazine containing a number of spools each having its thread end arranged in its internal space, discharging guideways on the magazine to receive the spools, a shuttle on the loom adjacent to the end of the guideways, a compressed air pipe, a nozzle thereon in register with the lowest spool in the guideways, a valve on the said pipe and means for automatically operating the said valve to eject the thread end from the interior of the spool when in the lowest position in the guideways, and means for subsequently inserting the spool in the shuttle immediately the thread end has been driven out.

4. The combination with a loom of a spool magazine containing a number of spools each having its thread end arranged in its internal space, discharging guideways on the magazine to receive the spools a shuttle on the loom adjacent to the end of the guideways, a compressed air pipe, a weft detector controlled shaft, a rocking lever thereon, a member connecting the said lever to the valve adapted to open the said valve and eject the end of the thread by a blast of compressed air and means for subsequently inserting the spool into the shuttle immediately the thread end has been driven out.

5. The combination with a loom of a spool magazine containing a number of spools each having its thread end arranged in its internal space, discharging guideways on the magazine to receive the spools, a shuttle on the loom adjacent to the end of the guideways, a compressed air pipe, a weft detector controlled shaft, a rocking lever thereon, a member connecting the said lever to the valve adapted to open the said valve and eject the end of the thread by a blast of compressed air, a spool ejector governed by the weft-detector controlled shaft adapted to operate the ejector, to drive the spool out of the guides and insert it in the shuttle immediately after the thread end has been driven out.

6. A weft replenishing loom having, in combination, a magazine containing spools each of which has an internal space containing its loose thread end; a compressed air pipe in register with the spool which is in position to be transferred from the magazine to the lay; a valve in said pipe; an ejector acting to transfer spools from the magazine to the lay; a weft-detector controlled shaft; and mechanism operatively connecting said shaft with said valve and with said ejector whereby when said shaft is moved the loose thread end is first blown from the spool and then the spool is immediately transferred to the lay.

7. A weft replenishing loom having, in combination, a magazine containing spools each of which has an internal space containing its loose thread end; a compressed air pipe in register with the spool which is in position to be transferred from the magazine to the lay; a valve in said pipe; an ejector acting to transfer spools from the magazine to the lay; weft-detector controlled means; and mechanisms operatively connecting said weft-detector controlled means with said valve and with said ejector whereby when said weft-detector controlled means is moved the loose thread end is first blown from the spool and then the spool is immediately transferred to the lay.

In testimony whereof I have signed my name to this specification in the presence of two subscribing witnesses.

ALBERT GEORG KOECHLIN.

Witnesses:
GEO. GIFFORD,
AMAND RITTER.

Copies of this patent may be obtained for five cents each, by addressing the "Commissioner of Patents, Washington, D. C."